United States Patent Office 3,490,830
Patented Jan. 20, 1970

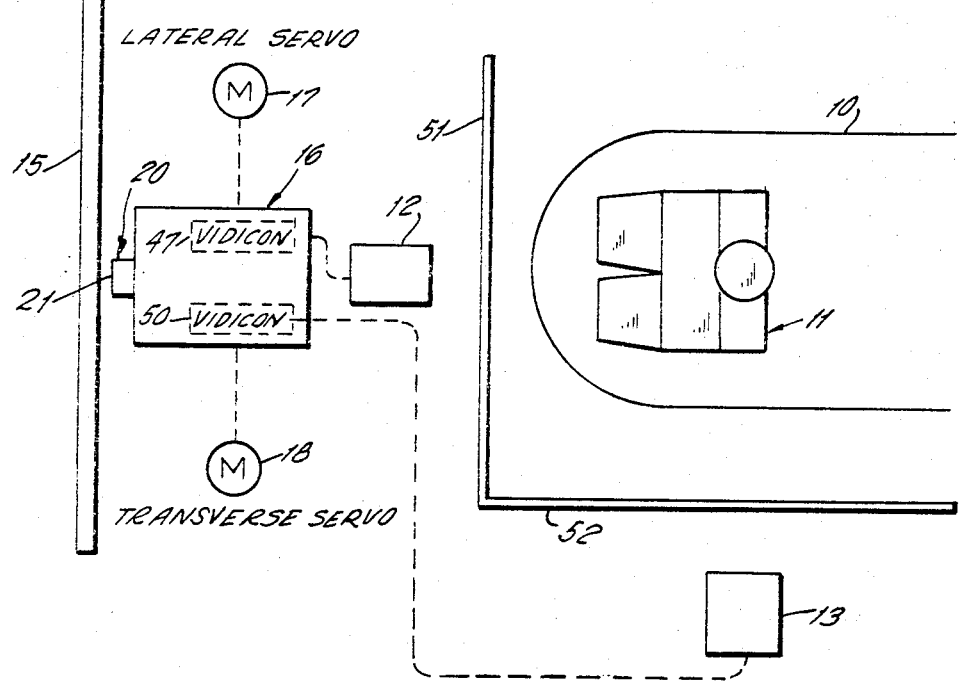
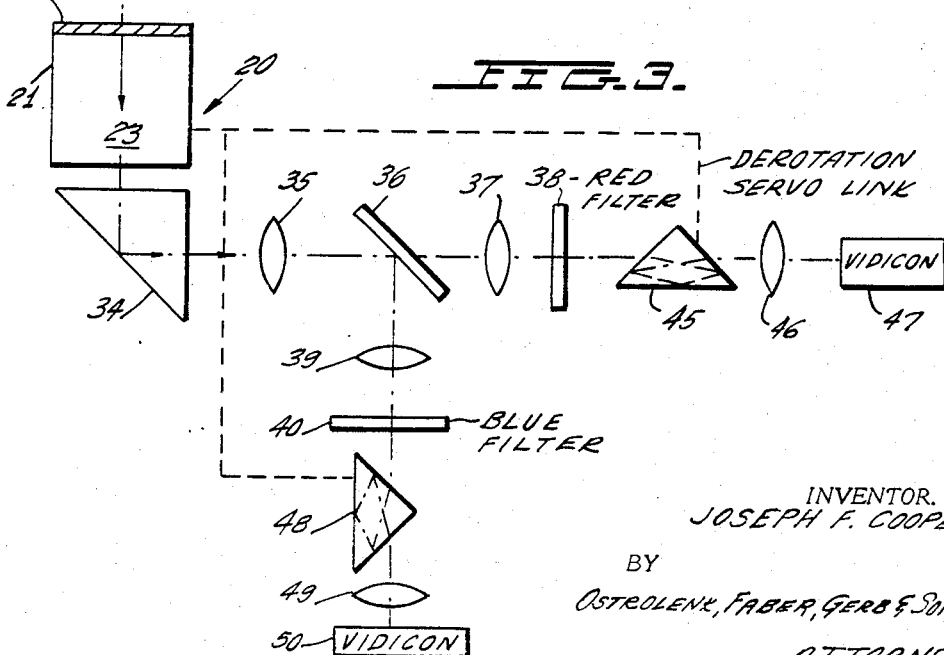

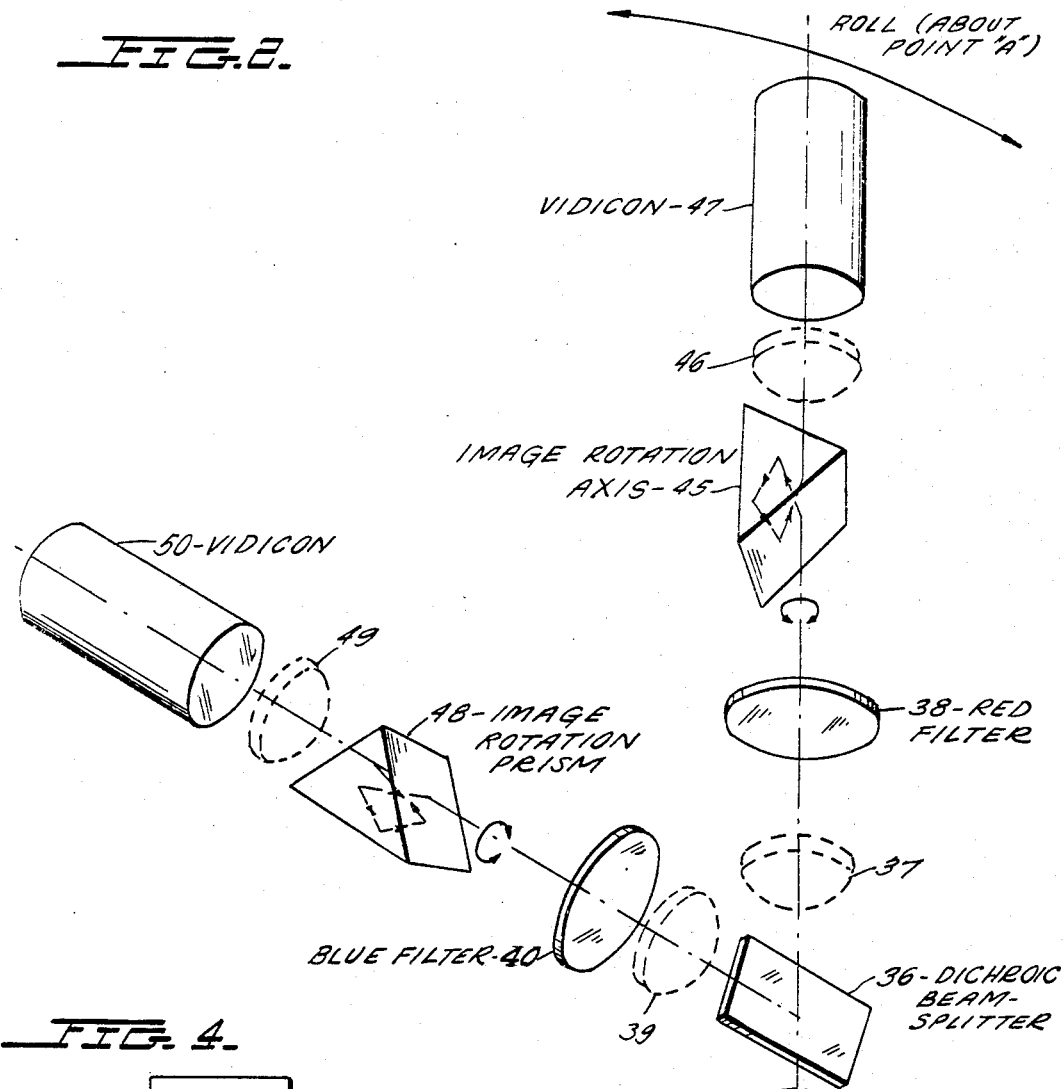
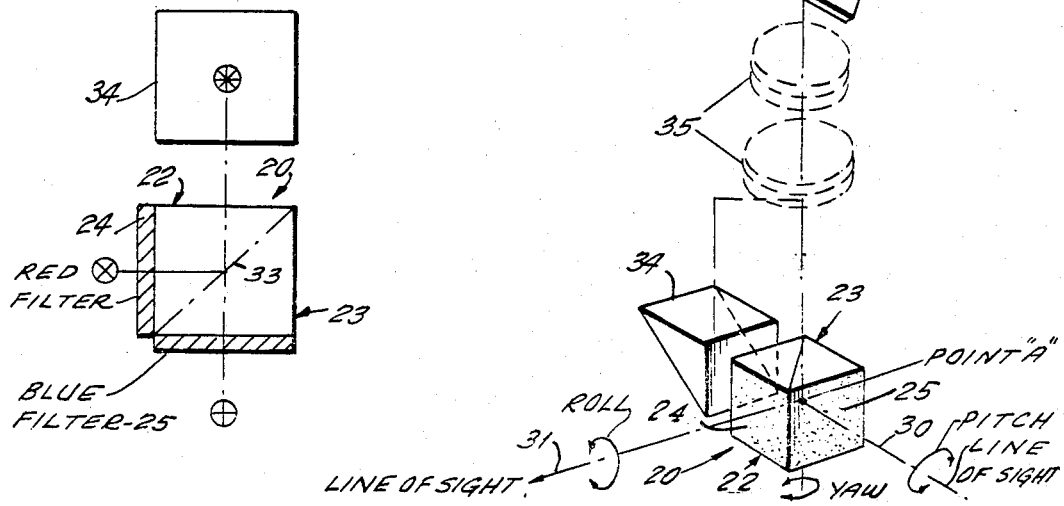

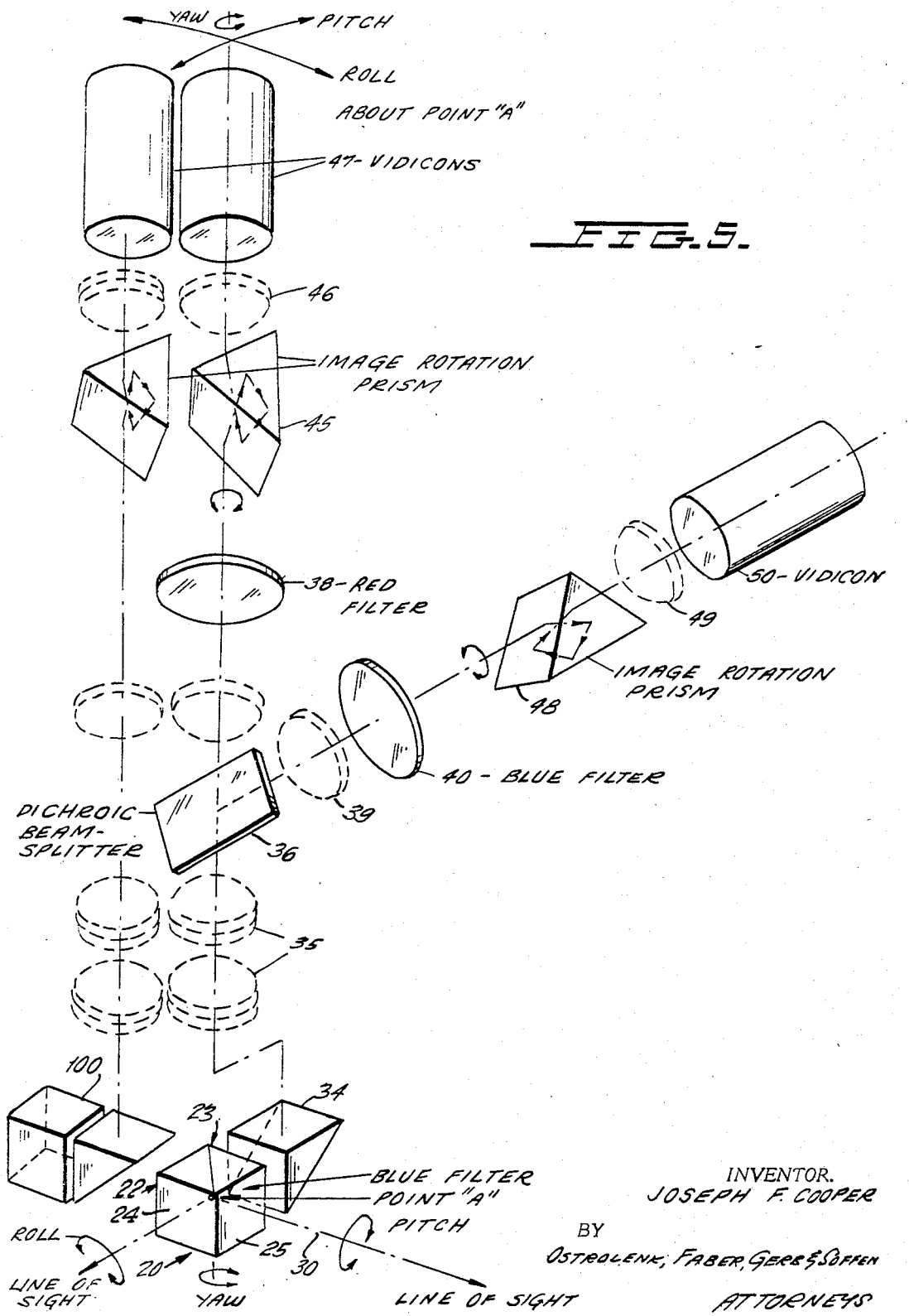

3,490,830
WIDE-ANGLE OPTICAL PICK-OFF
Joseph F. Cooper, Franklin Square, N.Y., assignor to Kollsman Instruments Corporation, Elmhurst, N.Y., a corporation of New York
Filed Feb. 2, 1966, Ser. No. 524,559
Int. Cl. G02b 5/28, 27/10, 27/14
U.S. Cl. 350—166                          7 Claims

ABSTRACT OF THE DISCLOSURE

An apparatus for providing a wide-angled view of a scene is disclosed herein which comprises a cubical beam splitter having a diagonal beam splitter surface and a pair of adjacent scene light refracting surfaces. The beam splitter is positioned relative to a scene so that the refracting surfaces each are normally in perpendicular relationship therewith. Each refracting surface directs incident scene light to a common entrance pupil point, located at the center of the diagonal beam splitter surface, and then along a common optical axis. The scene light entering each of the refracting surfaces is distinctively modified so that the scene light may be separated by means along the common optical axis and directed toward a pair of viewing means which, together, provide a continuous 188° scene field of view.

---

This invention relates to a wide angle optical system, and more particularly relates to an optical near body pick-off with a great depth of field and a field of view of the order of 188° by 98°.

Optical pick-offs or optical probes are well-known for observing a particular field of view and then optically transmitting this field of view to some suitable viewing system. For example, in the training of commercial airline pilots, or the like, it is common practice to provide an optical pick-off which is positioned with respect to a three-dimensional model, or slide transparency, or rear screen projection image. This image is transmitted to a viewing screen in front of the pilot and the pilot will adjust flight controls to properly move the probe with respect to the field of view.

At the present time, the field of view presented to the operator of such a simulated apparatus has been limited to a field approximately 98° by 98°. Therefore, true simulated conditions of actual flight are not present.

The present invention relates to a novel optical near body pick-off which extends the field of view to approximately 188° by 98°, thereby serving as an improved information-gathering element for projection to a viewer. In particular, and in accordance with the invention, a cubical beam splitter is used as the pick-off element wherein adjacent faces of the beam splitter observe fields of view which are orthogonal to one another. These two viewing surfaces then have interposed between them and their field of view some suitable light modifying means having distinguishable properties. By way of example, one face can have a first color filter and the second face a second color filter different from the first filter.

A cubical beam splitter interposed between the two surfaces then permits portions of the light impinging on each surface and suitably selectively modified to pass through a common optical channel, whereby a central point in the beam splitter serves as a common entrance pupil for the two scenes viewed by the two surfaces of the cubical beam splitter.

The two images observed by the two surfaces will then travel in the same direction by virtue of the beam splitter until they reach a second light separating device which separates the two beams according to their modified properties. Thus, if the two beams differ from one another in color, a dichroic beam splitter is interposed in the path in which the combined light beams move. Light having a first color coming from the first field of view will then pass through the beam splitter to a first image viewing means such as a vidicon, while the second beam will be reflected by the dichroic beam splitter to pass through to a second vidicon. Note that the first and second vidicons will also have appropriate filters interposed therebetween to get a purer sample of the light coming from their respective field of view.

The outputs of the vidicons or other suitable image observing means may then be connected to suitable projection systems which could simulate, for example, the windows of an aircraft cabin in which the pilot trainee is located. Thus, the pilot trainee will have an accurate representation of a field of view which is of the order of 188° by 98°.

Accordingly, a primary object of this invention is to provide a novel ultra-wide-angle optical probe.

Yet another object of this invention is to provide a novel optical probe having 188° by approximately 98° instantaneous field of view.

Another object of this invention is to provide a novel optical viewing system which presents a realistic view of a simulated environment.

These and other objects of this invention will become apparent from the following description when taken in connection with the drawings, in which:

FIGURE 1 schematically illustrates a training system incorporating the novel near body optical pick-off of the present invention.

FIGURE 2 is an exploded perspective diagram of the optical probe structure used in FIGURE 1.

FIGURE 3 is a side view of the assembled structure of FIGURE 2.

FIGURE 4 is a top view of the cubical beam splitter of FIGURE 3 to illustrate the light rays passing through the cubical beam splitter.

FIGURE 5 shows the manner in which a third channel can be added to the arrangement of FIGURE 2 to provide three orthogonal fields of view.

Referring first to FIGURE 1, I have illustrated therein a typical simulated training system for pilots which includes a simulated cabin 10 having the trainee 11 therein who will have available to him the standard aircraft flight controls.

The trainee 11 will fly in accordance with the pictures shown to him of his simulated environment by the two television projectors 12 and 13 which produce the forward and left scenes on the rear projection screens 51 and 52 in front of and to the side of the cabin.

The environment to be depicted to the observer 11 is then formed of a suitable model or screen 15 which can have a rear projection thereon of the environment, and alternatively could be a slide transparency.

The optical pick-off system for transmitting the image of the field of view to the projectors 12 and 13 is comprised of the optical system 16 which could be moved, if desired, by lateral servo 17 and transverse servo 18 in directions with respect to the model 15, as dictated by the manipulation of controls by the observer 11. Additional servos provide motion of the probe elements about the pitch, roll and yaw axes.

It will now be apparent that a wide field of view is extremely desirable, since this will simulate the normal wide field of view that would be available to the operator of an aircraft, or the like. To this end, a cubical beam splitter 20 is provided which has surface 21, shown in FIGURE 1, which may be located as close as desired to the screen 15 thereby simulating aircraft altitude.

Referring now to FIGURES 2, 3 and 4, the cubical beam splitter 20 is composed of two right angle prisms 22 and 23 which are directly secured to one another along their diagonal face. The surface of one of the prisms is half aluminized before cementing with a clear cement to define a cubical beam splitting structure.

In accordance with a preferred embodiment of the invention, one surface of prism 22 is covered with a red filter 24, while the adjacent surface of prism 23 is covered with a blue filter 25. The red and blue have been selected since they give a relatively wide separation in the spectrum which will eliminate later interference between the light rays and permits easier subsequent separation of the light rays.

The line of sight of the surface of the cubical beam splitter having filter 24 is shown as the line of sight 31, and rotation about this line of sight will be the roll of the instrument. The surface of prism 23 having filter 25 thereon will have a line of sight 30 with rotation about the line of sight 30 defining the pitch of the instrument. Rotation about a line perpendicular to the plane formed by lines 30 and 31 will then define the yaw of the instrument.

The junction between the surfaces of prisms 22 and 23 will be half silvered as due to the half silvering of one of the surfaces prior to its cementing, thereby to define a beam splitting junction 33. This junction, or beam splitting surface 33, will permit the combination of light rays from lines of sight 30 and 31 to be combined together and to be transmitted in a common direction.

Thus, light impinging upon filter 25 will have a portion thereof passing through the beam splitting surface 33. In a similar manner, light impinging upon filter 24 will be reflected by the beam splitter surface 33 so as to travel in the same direction as the light transmitted through filter 25.

It will be noted that the center of the beam splitting surface 33 serves as the intersection of the pitch, roll and yaw axes, and serves as a common entrance pupil point for the images observed through filters 24 and 25.

The light passing through and reflected by beam splitter surface 33 is then passed to a prism 34 which redirects the light through a suitable image-forming optical system 35 of any desired type, and thence to a dichroic beam splitter 36.

The dichroic beam splitter 36, as best seen in FIGURES 2 and 3, will then pass the red portion of the spectrum through a suitable lens 37 and through a red filter 38 so that the light passing the filter 38 will be substantially the image observed along line of sight 31. The blue portion of the light impinging on the dichroic beam splitter 36 will be reflected toward a suitable optical system 39 and a blue filter 40. Once again the light passing through the blue filter 40 will be substantially that observed along line of sight 30.

It should be noted that this color discrimination will minimize "cross-talk" by insuring sufficient separation between the band passing ranges of the various filters. Clearly, other colors could have been selected and other means of distinguishing between the light observed along lines 30 and 31 could be used. For example, suitable light polarization techniques could be applied in accordance with the present invention.

After passing through the red filter, the image seen along line of sight 31 will pass to a suitable image derotation prism 45 and an optical lens 46 ot a vidicon 47, or any other suitable image-observing means. In a similar manner, the blue light passing through blue filter 40 will pass through the image derotation prism 48 through the optics 49 to the vidicon 50.

The image derotation prisms are then connected to suitable servos which may be driven by computer command to keep the images of vidicons 47 and 50 properly oriented with respect to the theoretical attitude of whatever vehicle the probe may be simulating.

The function of the derotation prism(s) is to negate the image rotation imparted to the incoming scene by the rotation of the reflecting surfaces of the beam splitter (cube) and the deviating prism (adjacent to the beam splitter cube) as the probe is caused to rotate about its axes.

The output of the vidicons 47 and 50, as schematically illustrated in FIGURE 1, is then connected to the projectors 12 and 13 which will present to the viewer 11 the views observed through the surfaces 24 and 25 of the cubical beam splitter. Note that this field of view may be of the order of 188° by 98°.

A third line of sight, i.e. the right side view, may be provided by the addition of a second (single) optical train adjacent to the dual channel as shown in FIGURE 5, in which similar numerals identify identical components to those of FIGURES 2, 3 and 4.

In FIGURE 5, three orthogonal fields of view thus provided will effect a 278 degree instantaneous horizontal field angle. The beam splitter cube in this configuration will not rotate with respect to prism 34 (about pitch axis 30) as in FIGURE 2, but will be constrained to rotate with the probe as a whole (about point A) as indicated. The compensation cube 100 of FIGURE 5 serves to effect equal glass paths in the single (right side) channel and the dual channel.

A wide-angle optical pick-off containing the elements depicted in FIGURE 2 and the probe and display system depicted in FIGURE 1 has been built and tested at the Kollsman Syosset facility. The feasibility of the concept was proven valid.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. An apparatus for providing a wide-angle view of a scene, said apparatus comprising a cubical beam splitter, means adjustably mounting said cubical beam splitter for movement relative to said scene, said cubical beam splitter having a diagonal beam splitter surface and first and second adjacent scene light refracting surfaces having a common edge with said diagonal beam splitter surface, said diagonal beam splitter surface having a center point defining a common entrance pupil point, said first and second refracting surfaces respectively refracting first and second portions of incident scene light to said common entrance pupil point, said first and second portions defining first and second orthogonal scene fields of view, the first of said portions passing through said common entrance pupil and along an optical axis, the second of said portions being reflected at said common entrance pupil point along said axis by said beam splitter surface, incident scene light modifying means for intercepting and distinctively modifying said first and second portions of incident scene light, and light separator means along said axis differentially responsive to the distinctively modified scene light to direct the light of the first of said portions toward first viewing means and to direct the light of the second of said portions toward second viewing means whereby said first and second viewing means together provide a continuous scene field of view of approximately 188°.

2. An apparatus in accordance with claim 1 said cubical beam splitter having first, second and third orthogonal axes intersecting at said common entrance pupil point, the first and second of said axes being normal to said first and second refracting surfaces respectively, said means adjustably mounting said cubical beam splitter operable to rotate cubical beam splitter about said axes, whereby pitch, roll and yaw may be simulated.

3. An apparatus in accordance with claim 2 said cubical beam splitter having first, second and third orthogonal axes intersecting at said common entrance pupil point, the first and second axes being normal to said first and second refracting surfaces respectively, said means adjustably mounting said cubical beam splitter operable to impart translational movement of said cubical beam splitter about said axes.

4. An apparatus in accordance with claim 1 wherein said incident scene light modifying means includes first and second respective color filters, said light separator means comprising a dichroic beam splitter.

5. An apparatus in accordance with claim 8 wherein said first and second viewing means includes vidicon means.

6. An apparatus in accordance with claim 1 wherein a first and second image rotation prism is interposed in front of said first and second image viewing means, respectively.

7. An apparatus in accordance with claim 1 wherein said cubical beam splitter comprises a first and second right angle prism secured to one another along their diagonal surfaces, one of said diagonal surface half-silvered to define said beam splitting surface.

References Cited

UNITED STATES PATENTS

| | | |
|---|---|---|
| 1,209,958 | 12/1916 | Graul. |
| 1,253,796 | 1/1918 | Douglass _____ 350—173 X |
| 2,121,255 | 6/1938 | Miller _____ 350—174 |
| 2,669,902 | 2/1954 | Barnes _____ 350—174 X |
| 2,747,460 | 5/1956 | Calvi _____ 350—174 X |
| 2,792,740 | 5/1957 | Haynes _____ 350—171 |
| 3,164,056 | 1/1965 | Wick et al. |
| 3,303,739 | 2/1967 | Chitayat _____ 350—96 X |
| 3,333,053 | 7/1967 | Back. |

DAVID SCHONBERG, Primary Examiner

T. H. KUSMER, Assistant Examiner

U.S. Cl. X.R.

350—169, 174